United States Patent
Ju et al.

(10) Patent No.: US 7,949,526 B2
(45) Date of Patent: May 24, 2011

(54) VOICE AWARE DEMOGRAPHIC PERSONALIZATION

(75) Inventors: Yun-Cheng Ju, Bellevue, WA (US); Alejandro Acero, Bellevue, WA (US); Neal Bernstein, Mercer Island, WA (US); Geoffrey Zweig, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 11/810,086

(22) Filed: Jun. 4, 2007

(65) Prior Publication Data

US 2008/0298562 A1 Dec. 4, 2008

(51) Int. Cl.
*G10L 15/00* (2006.01)
(52) U.S. Cl. .................. 704/246; 704/251; 704/270
(58) Field of Classification Search .......... 704/246, 704/251, 270
See application file for complete search history.

(56) References Cited

U.S. PATENT DOCUMENTS

| | | | | |
|---|---|---|---|---|
| 6,151,571 | A | 11/2000 | Pertrushin | 704/209 |
| 6,349,290 | B1 * | 2/2002 | Horowitz et al. | 705/35 |
| 6,529,871 | B1 | 3/2003 | Kanevsky et al. | 704/246 |
| 6,665,644 | B1 | 12/2003 | Kanevsky et al. | 704/275 |
| 6,842,767 | B1 * | 1/2005 | Partovi et al. | 709/203 |
| 7,062,441 | B1 | 6/2006 | Townsend | 704/270 |
| 2002/0046030 | A1 | 4/2002 | Haritsa et al. | 704/256 |
| 2004/0006483 | A1 * | 1/2004 | Sasaki et al. | 704/277 |
| 2004/0215451 | A1 | 10/2004 | MacLeod | 704/231 |
| 2004/0215453 | A1 * | 10/2004 | Orbach | 704/231 |
| 2005/0108011 | A1 | 5/2005 | Keogh et al. | 704/243 |
| 2006/0111904 | A1 | 5/2006 | Wasserblat et al. | 704/246 |
| 2006/0212897 | A1 | 9/2006 | Li et al. | 725/32 |
| 2006/0229505 | A1 | 10/2006 | Mundt et al. | 600/300 |
| 2007/0087834 | A1 * | 4/2007 | Moser et al. | 463/42 |

OTHER PUBLICATIONS

Iseli et al., M., "Age and Gender-Dependent Analysis of Voice Source Characteristics," UCLA, 2006 IEEE ICASSP 2006, pp. I-389-I-392.
L. Cerrato, M. Falcone and A. Paoloni. "Subjective Age Estimation of Telephonic Voice," Speech Communication, 31(2-3): 107-112, Jun. 2000.

* cited by examiner

*Primary Examiner* — Daniel D Abebe
(74) *Attorney, Agent, or Firm* — Westman Champlin & Kelly, P.A.

(57) ABSTRACT

A voice interaction system is configured to analyze an utterance and identify inherent attributes that are indicative of a demographic characteristic of the system user that spoke the utterance. The system then selects and presents a personalized response to the user, the response being selected based at least in part on the identified demographic characteristic. In one embodiment, the demographic characteristic is one or more of the caller's age, gender, ethnicity, education level, emotional state, health status and geographic group. In another embodiment, the selection of the response is further based on consideration of corroborative caller data.

17 Claims, 3 Drawing Sheets

VOICE AWARE DEMOGRAPHIC PERSONALIZATION

BACKGROUND

Voice interaction with computational devices is becoming increasingly common. For example, users can control some software operating systems with voice commands; automobiles are appearing with voice control systems for accessory control and navigation; and consumers can increasingly access information by telephone through speech interaction with an automated system. These are just a few of many examples of implementations of voice interaction technology.

Currently, many voice interaction systems support a "one size fits all" approach in terms of how different users experience interaction with the system. Systems that are not configured to behave in the same way for all users generally require a log-in or other identification procedure that supports explicit communication of a basis upon which to choose one behavioral response over another. Thus, current systems are either inflexible or require explicit interactions in order to provide a customized interaction experience.

The discussion above is merely provided for general background information and is not intended for use as an aid in determining the scope of the claimed subject matter.

SUMMARY

A voice interaction system is configured to analyze an utterance and identify inherent attributes that are indicative of a demographic characteristic of the system user that spoke the utterance. The system then selects and presents a personalized response to the user, the response being selected based at least in part on the identified demographic characteristic. In one embodiment, the demographic characteristic is one or more of the caller's age, gender, ethnicity, education level, emotional state, health status and geographic group. In another embodiment, the selection of the response is further based on consideration of corroborative caller data.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
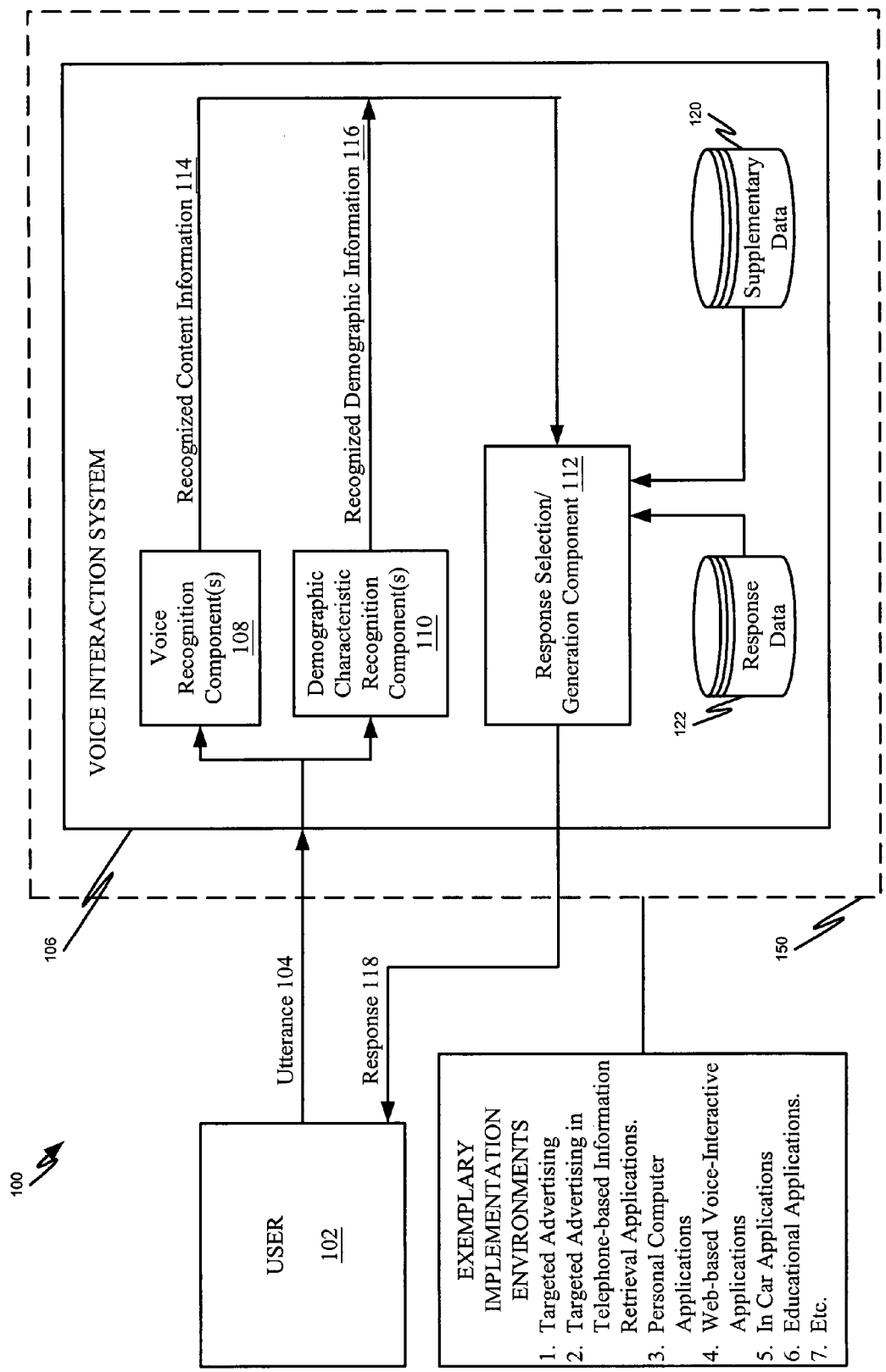
FIG. 1 is a schematic representation of a voice interaction environment.

FIG. 1 is a schematic representation of a voice interaction environment 100. Environment 100 is but an example and is not intended to suggest any limitation as to scope of use or functionality of embodiments of the present invention. Neither should environment 100 be interpreted as having any dependency or requirement relating to any one or combination of illustrated components.

Within environment 100, a user 102 speaks an utterance 104. A representation of the utterance is transferred to a voice interaction system 106. Utterance 104 is illustratively, but not necessarily, communicated into a microphone, such as, but not necessarily limited to, a microphone associated with a telephone device, a computing device or a vehicle control system.

Voice interaction system 106 includes a voice recognition component 108 and a demographic characteristic recognition component 110. Though illustrated as separate components, components 108 and 110 may be implemented as a single component without departing from the scope of the present invention.

Component 108 is illustratively configured to receive utterance 104 (or at least a representation thereof) and perform a speech recognition process in order to identify associated content information 114. Information 114 is illustratively a representation of what was said. Content information 114 is provided to a response selection/generation component 112.

Component 110 is illustratively configured to receive utterance 104 (or at least a representation thereof) and perform a demographic characteristic recognition process in order to identify associated demographic information 116. Information 116 is illustratively one or more of the caller's age, gender, ethnicity, education level, emotional state, health status and geographic group, though the scope of the present invention is not limited to any of these particular demographic characteristics. Information 116 is provided to the response selection/generation component 112.

Component 112 provides a personalized response 118 to user 102. Response 118 is illustratively selected from a plurality of potential responses stored as part of a collection 122 of response data, though a given implementation may not include a distinct collection of such data. Component 112 is illustratively configured to select response 118 based at least in part on demographic information 116. In one embodiment, the selection of response 118 is further based on consideration of recognized content information 114.

In one embodiment, the selection of response 118 is further based on consideration of information contained in a collection 120 of supplementary data. The content of data collection 120 is not a critical detail. Data 120 can be any data that can be cross-referenced to gain information to inform the process of selecting response 118. In one embodiment, certainly not by limitation, data 120 includes knowledge of a past user interactions (previous requests, etc.), user profiles (e.g., marital status, number of children in house, address, etc.), and/or information found on the web or some other Internet source.

In one embodiment, not all demographic characteristic determinations are made solely based on information derived directly from utterance 104. For example, in one embodiment, user profile information from source 120 is utilized to support a determination relative to a demographic characteristic (age, gender, ethnicity, educational level, mood, status of health, etc.). In one embodiment, information from multiple sources (e.g., from sources 120 and 110) is utilized to support a determination relative to a demographic characteristic.

It should be noted that the precise form of response 118 is also not a critical detail. Response 118 can be audio or textual information presented to user 102. Alternatively, it could be actuation of a mechanical device. Or, it could be an adjustment of a user-software interaction scheme. It should also be noted that response 118 need not necessarily be a single interaction. It is within the scope of the present invention to personalize a plurality of response based on a single utterance, or to personalize a single response based on a plurality of utterances, or to personalize a plurality of utterances based on a plurality of utterances, etc.

In general, by considering at least information 116 and optionally information 114 and/or data 120, response selection/generation component 112 is able to interact with user 102 in a highly personalized manner. There are many potential ways in which this concept can be practically implemented, and the scope of the present invention is not limited to any one particular implementation. Within FIG. 1, voice interaction system 106 is shown as being implemented within an implementation environment 150. A list of specific implementations is provided and includes:

1) Targeted advertising implementations—for example—wherein user 102 is provided with a personalized advertisement 118 in response to utterance 104;
2) Targeted advertising implementations in telephone-based information retrieval applications—for example—wherein user 102 is provided with a personalized advertisement 118 in response to input 104 spoken into a telephone when user 102 is interacting with an information retrieval system (e.g., a directory assistance system where users receive free information in return for listening to advertisements);
3) Personal computer applications—for example—wherein user 102 is provided, in response to utterance 104, with a response 118 in the form of personalized computer behavior (e.g., a Laotian woman searching her kitchen PC for chicken menu suggestions is presented with Laotian dishes listed first);
4) Web-based voice-interactive applications—for example—wherein user 102 is provided, in response to utterance 104, with a response 118 in the form of personalized application behavior;
5) In car applications—for example—wherein user 102 is provided, in response to utterance 104, with a response 118 in the form of personalized vehicle control;
6) Educational applications—for example—wherein user 102 is provided, in response to utterance 104, with a response 118 in the form of behavior that is tailored to be educationally appropriate for the user (e.g., an educational program is illustratively configured to interact with an upset 5 year old boy, as determined by his voice, differently than it interacts with a happy 7 year old girl);
7) Further applications of voice-aware demographic personalization include intelligent toys and consumer devices (e.g., music players, televisions, etc.).
8) And many more . . . .

Again, the present limitation is not limited to any particular implementing environment regardless of whether discussed herein or not. However, for the purpose of providing a complete description, an example implementation will now be provided.

Figure 2:
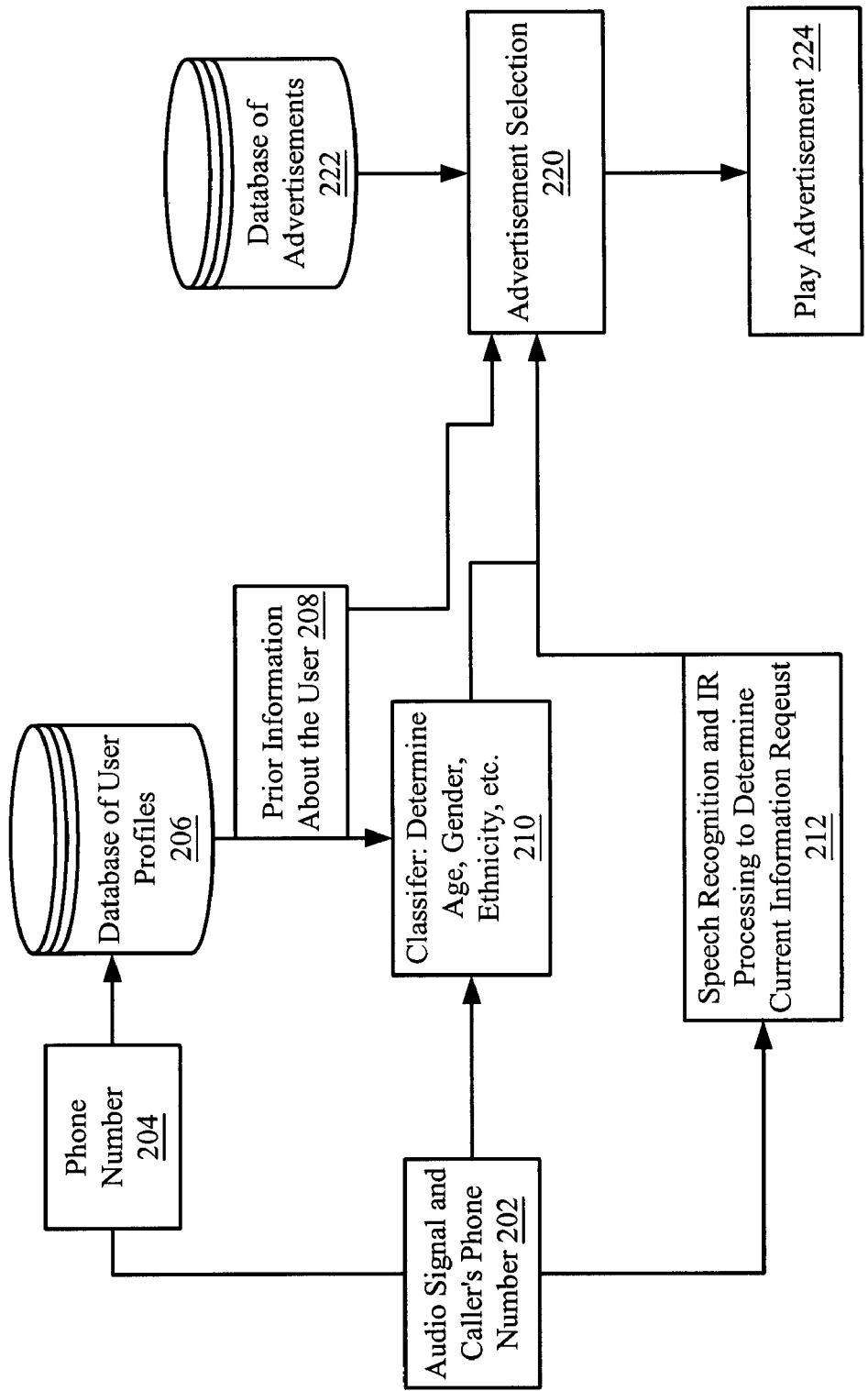
FIG. 2 is a schematic flow diagram demonstrating steps associated with processing within a voice interaction system.

FIG. 2 is a schematic flow diagram illustrating steps associated with processing within a voice interaction system 106 implemented within the context of a targeted advertising implementation, specifically an implementation wherein a user seeking information (e.g., directory information) interacts with the system through a telephone interface.

In accordance with block 202, an audio signal, which is indicative of an utterance spoken by the user into a telephone, is collected along with a telephone number associated with the telephone being used. The phone number, which is designated in FIG. 2 with identifier 204, is then utilized to index a database 206 that contains information available about one or more individuals associated with the phone number. In one embodiment, this information includes any or all of age, marital status, residence address, number of children, previous queries, or any other profile information. In one embodiment, this information is referred to herein as "metadata."

This information is illustratively utilized to determine a "prior" information 208 for different characteristics of potential users of the phone. For example, if a 70-year-old widower of Eastern European descent is known to own the phone, the prior on age might be, for example, a single Gaussian distribution centered on 70 years old. The prior on gender might be, for example, 80% male, and the prior on ethnicity might be, for example, 90% Eastern European. The priors are illustratively not 100% in order to allow for the possibility that an acquaintance is using the phone. In one embodiment, appropriate priors are determined based on statistics indicative of phone usage.

Prior information 208 is provided to a classifier 210. Classifier 210 illustratively combined with an analysis of the acoustic signal in order to support a determination of demographic characteristics of the caller (e.g., age, gender, ethnicity, education level, mood, geographic groups, health, etc.). In one embodiment, hot by limitation, age, gender, ethnicity, education level and mood are computed in accordance with the following formulae:

$$age = \operatorname{argmax}_a P(a|\text{phonenumber}, \text{metadata}) P(\text{audiodata}|a)$$

$$gender = \operatorname{argmax}_{g=\{m,f\}} P(g|\text{phonenumber}, \text{metadata}) P(\text{audiodata}|g)$$

$$ethnicity = \operatorname{argmax}_e P(e|\text{phonenumber}, \text{metadata}) P(\text{audiodata}|e)$$

$$education\text{-}lvl = \operatorname{argmax}_d P(d|\text{phonenumber}, \text{metadata}) P(\text{audiodata}|d)$$

$$mood = \operatorname{argmax}_m P(m|\text{phonenumber}, \text{metadata}) P(\text{audiodata}|m)$$

In one embodiment, the prior on the age is given by a mixture of Gaussians, and the priors on gender, ethnicity, education level and mood are given by discrete histograms. In one embodiment, in all cases, the probability of the audio-data given a category is determined by the likelihood of the acoustic feature vectors (e.g., MFCC or Perceptual Linear Preditive features) as determined by a Gaussian-mixture model (GMM). Those skilled in the art will appreciate that the features used and the probability models are not limited to those described herein and can be substituted with a wide range of alternatives without departing from the scope of the present invention. For example, the process of Vocal-Tract Length Normalization (VTLN) may be used to augment or replace the specific implementation details described herein.

In accordance with block 212, speech recognition and IR processing are carried out in order to determine the information being requested. In one embodiment, this involves an interactive dialog to positively identify the user's request. For example, the user might be asking for a particular phone number or the show time of a horror movie at a local movie theatre.

In accordance with block 220, a database 222 of advertisements is searched and a determination is made as to a most appropriate advertisement. This determination is illustratively made based at least in part on demographic characteristic information derived at block 210, and/or prior information 208 derived from database 206, and/or the request information derived at block 212. For example, a teenage male asking for the show time of a horror movies might hear an advertisement for a nearby pizza parlor. However, a middle-age woman living in a wealthy neighborhood and asking for the phone number of a shoe store might hear an advertisement for a fancy clothing store. In accordance with block 224, the appropriate advertisement is played back to the user, illustratively but not necessarily prior to providing the requested information.

In one embodiment, advertisers pay for the right to play their advertisements to users with specific characteristics. In the case that multiple advertisers desire to target the same demographic, the selection is illustratively made by auction, random selection, payment-biased selection, or another technique.

In summary, in one specific embodiment, voice is utilized to identify demographic characteristics (such as, but not limited to, gender, age, ethnicity, education level, or mood), which are utilized as a basis for adapting or determining the behavior of an interactive automated system. Implementations of this can include, but are not limited to, applications for targeting advertising in telephone-based information retrieval systems; for personal computer applications; for web-based voice-interactive applications; for in-car applications such as navigation or accessory control; and for educational applications.

In another embodiment, the combination of voice-features with the content of a user's current and past interactions is utilized to determine personalized behavior. The personalized behavior can consist of playing a targeted advertisement. Or, it can consist of controlling an educational process. Or, any other implementation not limited to those described specifically herein.

In another embodiment, voice features are combined with any available prior information (e.g., marital status, number of children in the house, address, previous requests, etc.) in order to support a determination, for example a determination of age, gender, ethnicity, educational level, mood, etc.

Figure 3:
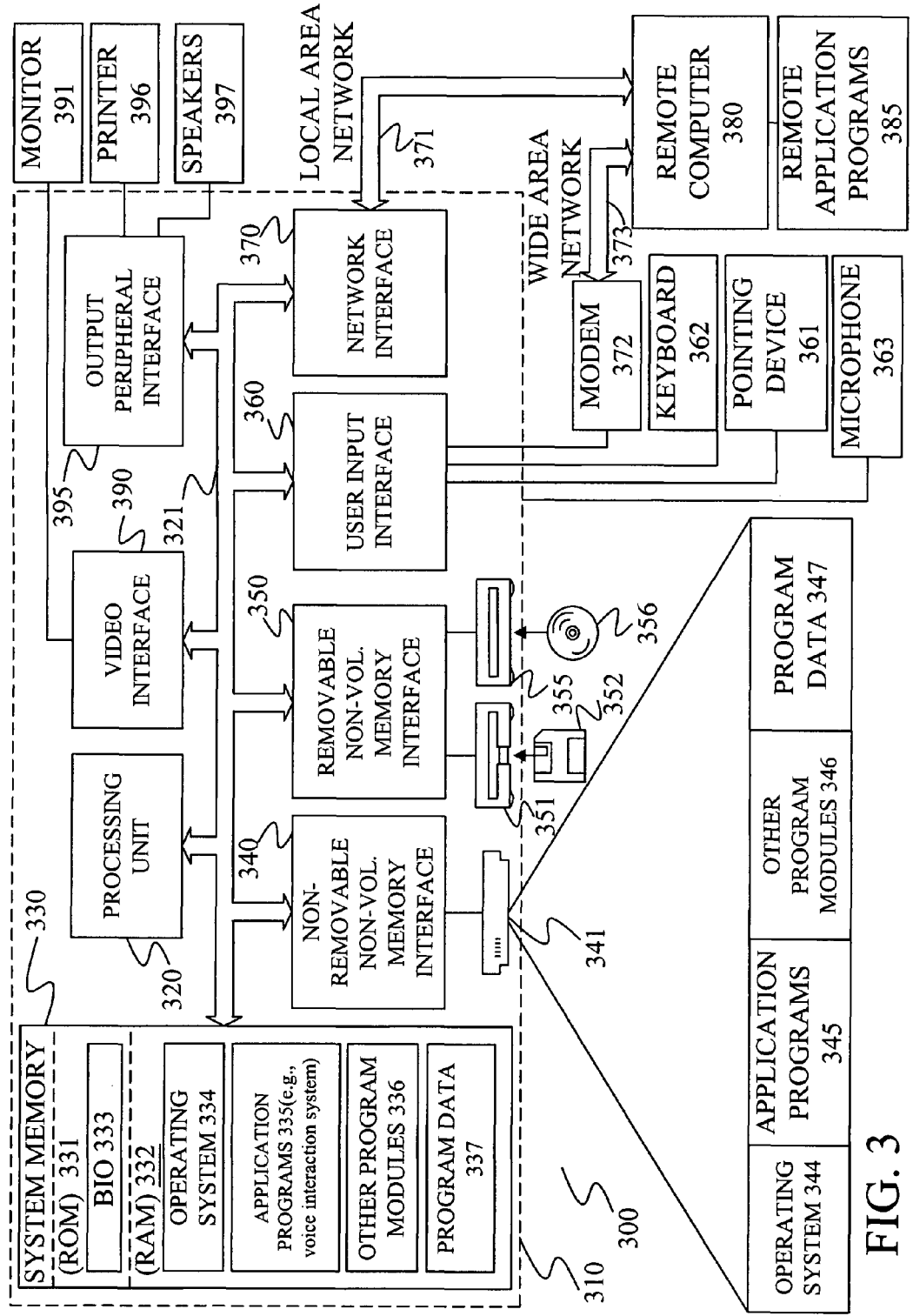
FIG. 3 is an example of a computing system environment.

FIG. 3 illustrates an example of a suitable computing system environment 300 in which embodiments described herein may be implemented. The computing system environment 300 is only one example of a suitable computing environment and is not intended to suggest any limitation as to scope of use or functionality. Neither should the computing environment 100 be interpreted as having any dependency or requirement relating to any one or combination of components illustrated in the exemplary operating environment 300.

The embodiments are operational with numerous other general purpose or special purpose computing system environments or configurations. Examples of well known computing systems, environments, and/or configurations that may be suitable for use with embodiments disclosed herein include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of a computer readable medium.

The embodiments may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the embodiments include a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. Programs 335 are shown as possibly including a voice interaction system, such as a system for providing a user with a personalized response based at least in part on inherent demographic characteristics of an utterance, embodiments of which are described herein in detail. This is but one example of where in environment 300 such a system might be implemented. Other implementations (e.g., as part of programs 345 or 385) should also be considered within the scope of the present invention.

The computer 310 may also include other removable/non-removable volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A voice interaction system, comprising:
    a voice recognition component configured to perform a voice recognition process to identify content information associated with an utterance spoken by a user;
    a demographic characteristic recognition component configured to identify a demographic characteristic of the user based on analysis of a representation of the utterance spoken by the user;
    a response data component having a plurality of potential responses stored as part of a collection of response data;
    a supplementary data component having data that is configured to be cross-referenced;
    a response selection component configured to supply a response, the response selection component receiving an indication of the identified content information from the voice recognition component, an indication of the demographic characteristic from the demographic characteristic recognition component, an indication of the plurality of potential responses from the response data component, and an indication of the data that is configured to be cross-referenced from the supplementary data component, the response selection component supplying the response based at least in part upon the indication of the identified content information, the indication of the demographic characteristic, the indication of the plurality of potential responses, and the indication of the data that is configured to be cross-referenced.

2. The system of claim 1, wherein the demographic characteristic is age, and wherein the voice recognition component and the demographic characteristic component are implemented as a single component.

3. The system of claim 1, wherein the demographic characteristic is gender, and wherein the voice recognition component and the demographic characteristic component are implemented as separate components.

4. The system of claim 1, wherein the demographic characteristic is ethnicity, and wherein the data that is configured to be cross-referenced includes data about past user interactions.

5. The system of claim 1, wherein the demographic characteristic is education level, and wherein the data that is configured to be cross-referenced includes user profiles.

6. The system of claim 1, wherein the demographic characteristic is mood, and wherein the data that is configured to be cross-referenced includes marital status.

7. The system of claim 1, wherein the demographic characteristic is geographic group, and wherein the data that is configured to be cross-referenced includes number of children in a house.

8. The system of claim 1, wherein the demographic characteristic is status of health, and wherein the data that is configured to be cross-referenced includes addresses.

9. The system of claim 1, wherein the data that is configured to be cross-referenced includes previous requests.

10. The system of claim 1, wherein the data that is cross-referenced includes indications of correlations between users and telephone numbers.

11. The system of claim 1, wherein the response is an advertisement presented audibly to the user.

12. The system of claim 1, wherein the response is activation of a software component.

13. The system of claim 1, wherein the response is activation of a web-based software component.

14. The system of claim 1, wherein the response is activation of a component of an in-vehicle control system.

15. The system of claim 1, wherein the response is activation of a component of an education application that is tailored to be educationally appropriate to the user based on an age of the user and a gender of the user.

16. A computer-implemented method of producing a personalized response from a voice interaction system, the method comprising:
- receiving an utterance from a user;
- providing prior information to a classifier;
- based on inherent qualities of a representation of the utterance and the prior information, determining a demographic characteristic of the user;
- supplying the personalized response based at least in part on the demographic characteristic; and
- wherein determining a demographic characteristic comprises determining multiple demographic characteristics, wherein supplying comprises supplying based at least on the multiple demographic characteristics, wherein the multiple demographic characteristics include age and gender, and wherein the age and gender are determined utilizing the equations:

$$age = \mathrm{argmax}_a P(a|phonenumber, metadata) P(audiodata|a)$$

$$gender = \mathrm{argmax}_g = \{m,f\} P(g|phonenumber, metadata) P(audiodata|g).$$

17. A computer-implemented method of producing a personalized response from a voice interaction system, the method comprising:
- receiving an utterance from a user;
- providing prior information to a classifier;
- based on inherent qualities of a representation of the utterance and the prior information, determining a demographic characteristic of the user;
- supplying the personalized response based at least in part on the demographic characteristic; and
- wherein the demographic characteristic is ethnicity, and wherein the ethnicity is determined utilizing the equation:

$$ethnicity = \mathrm{argmax}_e P(e|phonenumber, metadata) P(audiodata|e).$$

* * * * *

UNITED STATES PATENT AND TRADEMARK OFFICE
CERTIFICATE OF CORRECTION

| | | |
|---|---|---|
| PATENT NO. | : 7,949,526 B2 | Page 1 of 1 |
| APPLICATION NO. | : 11/810086 | |
| DATED | : May 24, 2011 | |
| INVENTOR(S) | : Yun-Cheng Ju et al. | |

It is certified that error appears in the above-identified patent and that said Letters Patent is hereby corrected as shown below:

In column 10, line 9, in Claim 16, delete "(audiodata|$\alpha$)" and insert -- (audiodata|a) --, therefor.

Signed and Sealed this
Nineteenth Day of July, 2011

David J. Kappos
*Director of the United States Patent and Trademark Office*